April 13, 1937.  H. H. McKEE ET AL  2,076,959
SLICING MACHINE
Filed Dec. 11, 1935  3 Sheets-Sheet 1

Harry H. McKee and
Nicholas J. Dziedzic
INVENTORS

WITNESS—

BY
ATTORNEY

April 13, 1937. H. H. McKEE ET AL 2,076,959
SLICING MACHINE
Filed Dec. 11, 1935 3 Sheets-Sheet 2

Harry H. McKee and
Nicholas J. Dziedzic,
INVENTORS
BY
ATTORNEY

April 13, 1937.　　H. H. McKEE ET AL　　2,076,959
SLICING MACHINE
Filed Dec. 11, 1935　　3 Sheets-Sheet 3

Harry H. McKee and
Nicholas J. Dziedzic
INVENTORS

WITNESS-
Wm C. Meiser

BY
ATTORNEY

Patented Apr. 13, 1937

2,076,959

UNITED STATES PATENT OFFICE 2,076,959

SLICING MACHINE

Harry H. McKee and Nicholas J. Dziedzic, Chicago, Ill., assignors to Industrial Patents Corporation, Chicago, Ill., a corporation of Delaware Application December 11, 1935, Serial No. 53,911

20 Claims. (Cl. 146—155)

The present invention relates to slicing machines, and more in particular to novel machines for severing slices from a body of meat and delivering groups of these slices in condition for wrapping in suitable packages for ready distribution.

This application is a continuation in part of our application entitled Slicing machine, Serial No. 554,628, filed August 3, 1931.

Among the objects of the present invention is to provide a novel slicing machine including a knife element adapted to sever slices from a body of meat, means being further provided and cooperating with the knife element for positioning these severed slices on a conveyor means in uniformly spaced and overlapping relation for delivery of the same to a place remote from the machine, where groups of these slices are enclosed or encased within suitable wrapping material.

Another object of the invention is to provide a novel slicing machine including a knife element adapted to sever slices from a body of meat and deliver the same to a conveyor, means being provided and adapted to cooperate with the knife element for compacting and compressing the severed slices on the conveyor means.

The invention comprehends the idea of providing a novel knife element in a meat slicing machine adapted to be reciprocated by suitable means within a plane and having lateral reciprocating movement within this plane for severing slices from a body of meat. Means is further provided for directing these severed slices onto a conveyor mechanism in a uniformly spaced and overlapped relation. The invention further contemplates the idea of including means adapted to cooperate with the reciprocating knife element for compacting and compressing these uniformly positioned slices upon the conveyor means.

A still further object of the invention is to provide novel conveying means in a meat cutting machine adapted to cooperate with a knife element thereof for delivering groups of slices of meat at intervals for packaging. Such conveyor means includes automatically operated transfer means adapted to raise or elevate groups of slices at intervals from a portion of the conveyor and rapidly transfer the same to another portion of the conveyor and away from the knife element thereof.

Still another object of the invention is to provide a novel conveying means in a meat cutting machine, which includes slow moving conveying elements adapted to receive slices severed from a body of meat by a knife element, and fast moving conveyor elements, means being provided for transferring groups of slices from the slow moving conveyor elements to the fast moving conveyor elements at intervals.

A further object of the invention is to provide a novel slicing machine comprising slow moving conveyor elements adapted to receive slices severed from a body of meat, which slices have been compacted by a compacting element operable with the knife element of the machine, and fast moving conveyor elements, transfer means being provided for transferring the compacted slices from the slow moving conveyor elements to the fast moving conveyor elements, this transfer means being provided with means whereby disengagement of the compacted slices is prevented during their transfer.

Other objects, capabilities, advantages and features are comprehended by the invention, as will later appear and as are inherently possessed thereby.

Referring now to the drawings.

Figure 1:
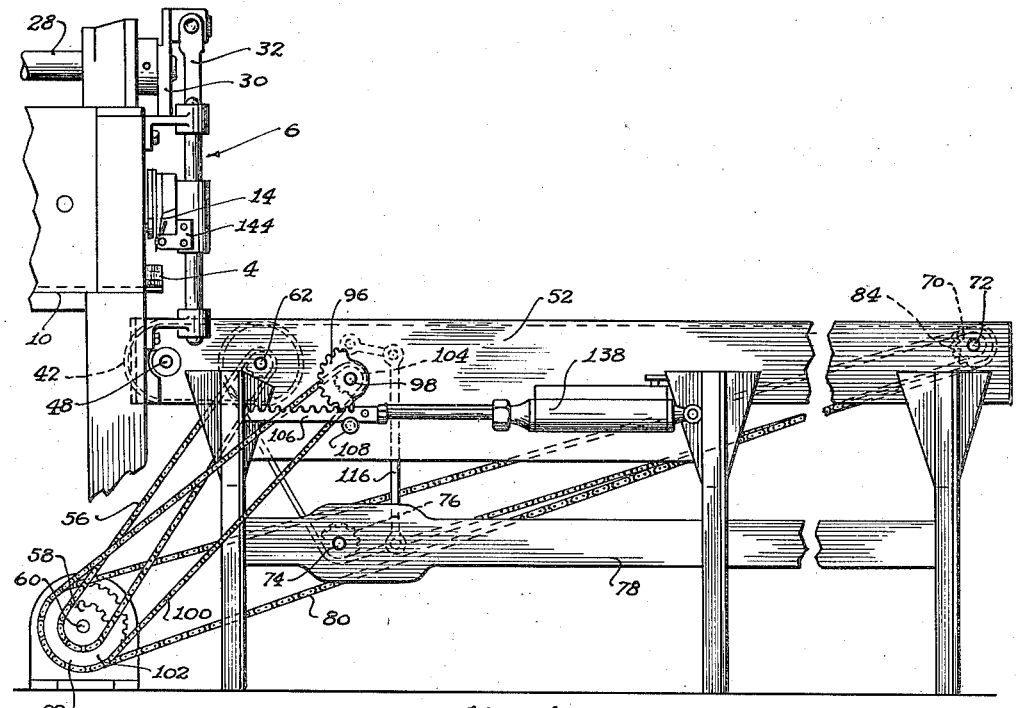
Figure 1 is a fragmentary view in end elevation of a slicing machine embodying the present invention.

Referring now more in detail to the drawings, an embodiment selected to illustrate the present invention is disclosed as comprising a main conveyor section 2 adapted to convey pieces of meat 4 into a cutting mechanism 6 positioned at the forward end thereof and which is adapted to sever slices from these pieces of meat and cause the same to be discharged onto an auxiliary conveying section 8 which is adapted to convey groups or sets of these slices in a uniform arrangement to a place where the same may be readily and easily lifted therefrom and suitably wrapped for shipment.

In the present illustrative embodiment, the pieces of meat 4 are disclosed as being pieces of bacon which have been derinded and properly treated, as by being smoked and the like. These pieces of bacon 4 are introduced into the main conveyor section 2 and at the rear end thereof between conveying elements 10 and 12, which cause the same to have a uniform progressive movement toward the front thereof.

The knife mechanism 6 is positioned at the front end of the main conveyor section 2 and comprises an elongated knife element 14 extending across substantially the entire distance of the open forward end of the main conveyor section 2. This knife element 14 is provided with guide screws or bolts 16 threaded therein, which are operable within guide slots 18 and 20 provided in a cross head 22 having hubs 24 slidably mounted on the vertical guide posts 26 suitably secured by any means at the side of the main conveyor section 2. Reciprocating movement of the cross head 22, as likewise the knife element 14 carried thereby, is effected by means of a horizontally disposed drive shaft 28 mounted on the top of the main conveyor section 2 and suitably operated by a motor or the like (not disclosed). This drive shaft 28 is provided with a crank arm 30 mounted on the forward end thereof for reciprocating a rod 32 connected thereto and to the cross head 22.

This drive mechanism causes the knife element 14 to have reciprocating movement in a substantially vertical plane, and although such movement would effectively sever slices from the pieces of bacon 4, the invention further contemplates the idea of giving the knife element 14 reciprocating movement in a lateral direction within this substantially vertical plane, in order to simulate the cutting movement of a knife and to provide slices having well defined surfaces free from shreds and loose particles of meat. This reciprocating movement in a lateral direction is effected by means of rolls 34 mounted upon the main conveyor section and in spaced relation for receiving a fin or other projecting element 36 of the knife element 14 therebetween, this projecting element 36 being angularly disposed whereby the knife element 14 is given a reciprocating lateral movement during the travel of this projecting element between the rolls 34.

The conveyor section 8 includes not only means for conveying the severed slices of bacon to a point for wrapping, but further includes means whereby a certain number of slices of bacon, approximating a given unit of weight, may be delivered at intervals of time to the point where the same are wrapped. In order to effect this result, the conveyor section 8 comprises a plurality of slow moving conveyor elements 42 suitably mounted for movement upon sprockets 44 and 46, which in turn are mounted upon the transverse shafts 48 and 50, respectively, mounted for rotation in the side frame members 52 of the conveyor frame 54. These conveyor elements 42 are moved at a suitable rate of speed by means of a drive element 56 passing over a sprocket 58 on a main drive shaft 60, this drive element 56 passing around another sprocket 62 mounted on the end of the shaft 50.

Groups of the severed slices are transferred at intervals from the slow moving conveyor elements 42 by a transfer means, generally designated as 64 and to be hereinafter more fully disclosed, to relatively fast moving conveyor elements 66. In the present illustrative embodiment, the ratio between the rates of travel of the elements 66 to the elements 42 is 2 to 1, although it is to be understood that the same may be varied within the scope of the invention. The conveyor elements 66 pass over sprockets 68 rotatively mounted upon the shaft 50 and over driving sprockets 70 secured to a shaft 72 mounted in the side frames 52 and at their forward end, and over idling sprockets 74 secured on a shaft 76 mounted in a lower frame member 78 of the conveyor section. The drive sprockets 70 are driven by means of a drive element 80 passing around a sprocket 82 secured to the main drive shaft 60 and a sprocket 84 mounted on the end of the shaft 72.

Figure 2:
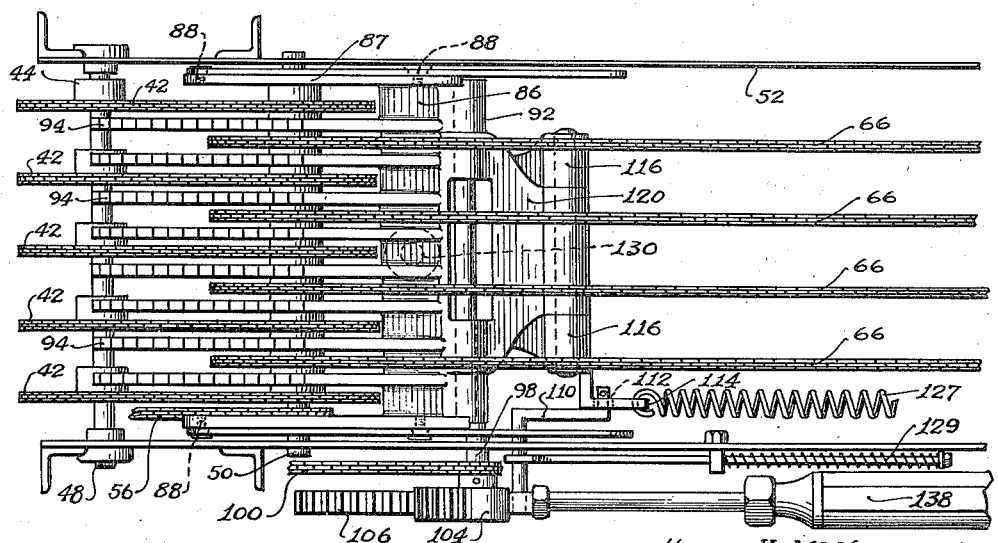
Figure 2 is an enlarged fragmentary top plan view of a portion of the embodiment disclosed in Figure 1 of the drawings.

The transfer means 64 comprises a transfer platform 84 having a body portion 86 substantially U-shaped in cross section provided with the arms 87 having lugs or roller units 88 projecting laterally therefrom and guided in the elongated slots 90 of a platform support 92. The transfer platform 84 is normally positioned below the conveying surfaces of the conveyor elements 42 and 66 and is provided with a plurality of serrated arms 94 disposed between the conveying elements 42 and 66, as clearly shown in Figure 2 of the drawings. In order to transfer groups of slices from the slow moving conveyor elements 42 to the fast moving conveying elements 66, the transfer platform 84 is raised so that the serrated portions of the arms 94 engage with a group immediately below the knife mechanism 6 to lift this group from the elements 42 and to transfer the same to the elements 66, after which, the platform 84 is moved again below these conveying elements.

The movement of translation of the platform 84 substantially parallel to the conveying elements 42 and 66 is effected through the medium of a mutilated gear 96 mounted upon a shaft 98 journaled in the frame members 52, this shaft being driven by means of a drive element 100 driven by a sprocket 102 mounted upon the shaft 60 and passing around a sprocket 104 mounted at the end of the shaft 98. This mutilated gear is driven at the proper speed and is provided with teeth meshing with the teeth on a rack 106 movable over a roll 108 mounted on one of the side frames 52, this rack having a Z-shaped rod 110 secured thereto which projects inwardly of the frame 52 and engages in a slot 112 of a lug 114 integral with an oscillating rod 116 secured, as by means of a bolt, rod, or the like 118, to the frame 78, this rod 116 being connected to the transfer platform 84 through the medium of a link member 120.

Figures 3, 6, 7:
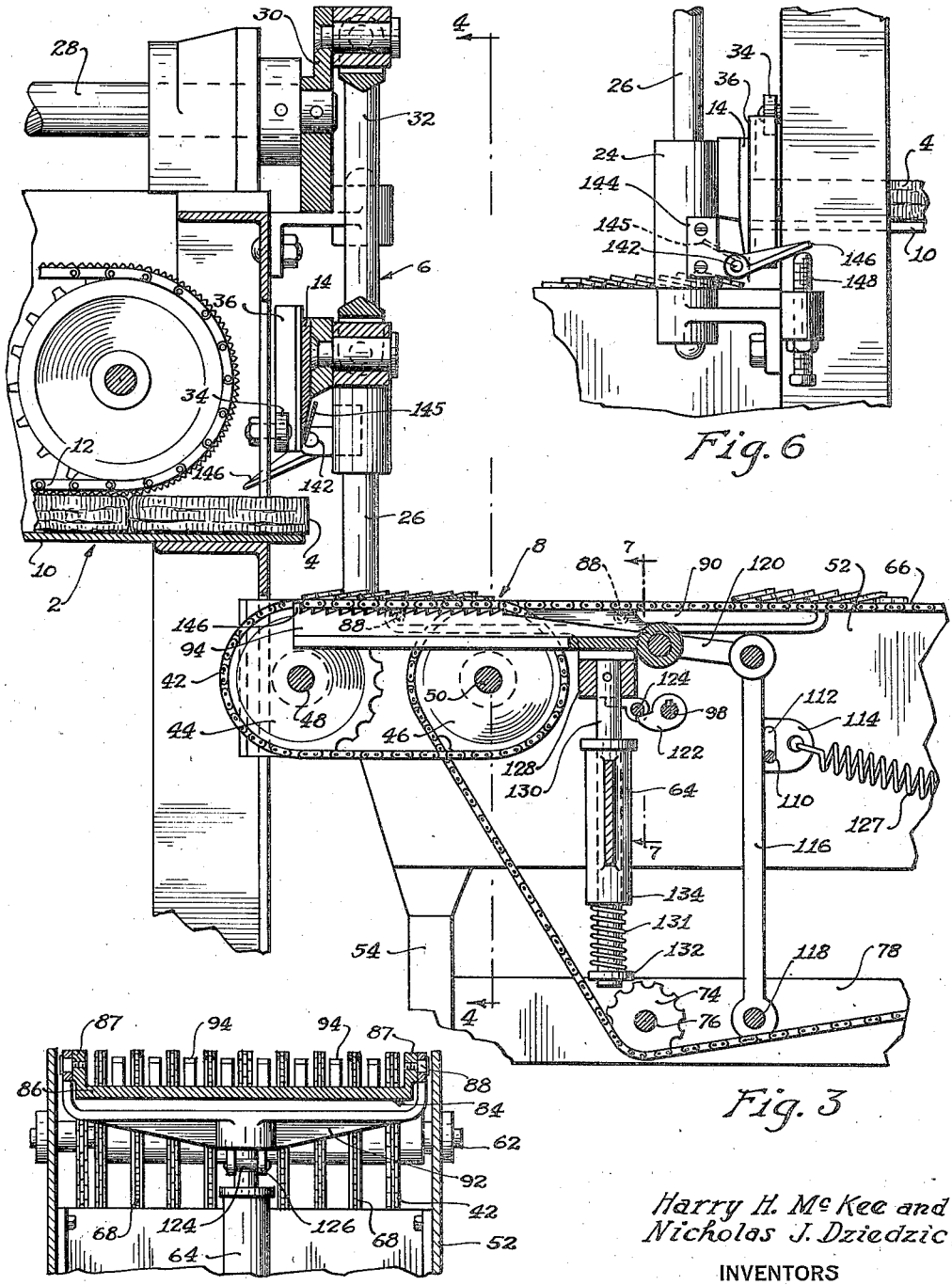
Figure 3 is a fragmentary view in vertical cross section of the embodiment disclosed in Figure 1 of the drawings.
Figure 6 is a fragmentary view in side elevation disclosing the knife element of the present invention in its lowermost position.
Figure 7 is a fragmentary view in vertical cross section taken in the plane represented by line 7—7 of Figure 3 of the drawings.
Figure 4:
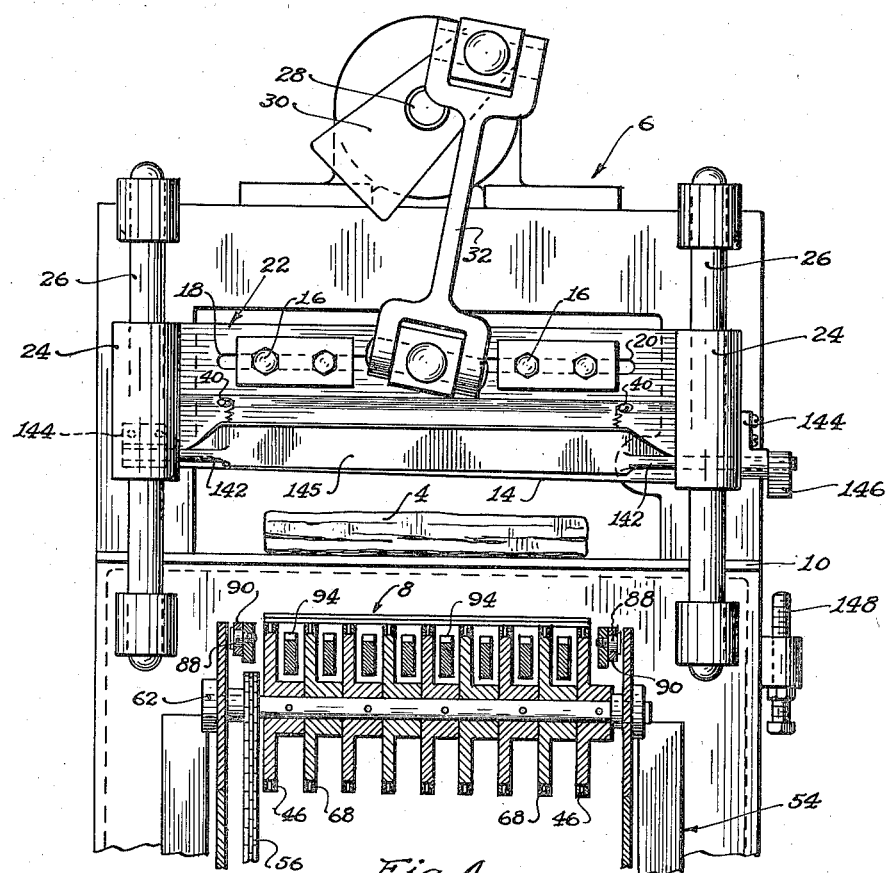
Figure 4 is a fragmentary view partly in cross section and partly in end elevation and taken in the planes represented by line 4—4 of Figure 3 of the drawings.
Figure 5:
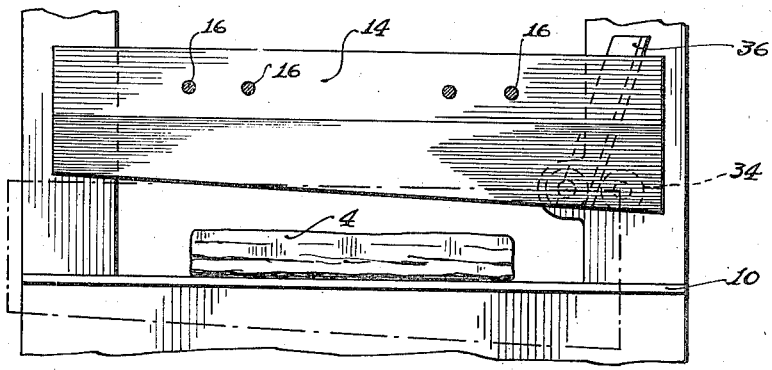
Figure 5 is a fragmentary diagrammatic view disclosing the movement of the knife element of the present slicing machine.

It will be quite apparent from the drawings, that when the teeth of the gear 96 engage with the teeth on the rack 106 and the gear 96 continues to rotate, the platform 84 is moved from its most forward position into the position as shown in Figure 3 of the drawings, and immediately below the group of slices on the conveyor elements 42 beneath the slicing mechanism 6. At this particular interval, the lug 122, which is mounted upon the shaft 98, engages a rod 124 secured in a bracket 126 connected to the hub 128 of the platform support 92 for lifting this platform support 92, as likewise the transfer platform 84, whereby the serrated arms 94 lift the group of slices thereabove from the conveying elements 42. The platform 84 is maintained in this raised position by the cam surface of the lug 122.

Just as the transfer platform 84 is raised through the medium of the lug 122, the teeth of the gear 96 become disengaged from the teeth of the rack 106, and under the influence of the coil springs 127 and 129, the transfer platform 84 is caused to be moved forwardly over the conveying elements 66 at a rather rapid and quick speed. Toward the end of this forward movement, the platform 84 is lowered due to the contour of the cam surface on the lug 122, whereby the group of transferred slices is lowered onto the conveying element 66, and the arms 94 of the platform are again lowered below these conveying elements.

The lowering of the platform support 92 is effected through the medium of a coil spring 131, fitting around the end of a rod 130 mounted in the hub 128, this spring abutting against an end shoulder 132 thereof and the lower end of the tubular member 134 slidably supporting the rod 130 which is held in position by means of the transverse webs 136 secured to the side frame members 52 in any suitable manner.

The forward movement of the platform 84 is cushioned by means of an air cylinder 138 having a piston 140 integral with the rack 106, whereby the rapid forward movement of the platform 84 is gradually decreased toward its most forward position.

Adjacent the forward face of the knife element 14 and knife guard 38 is a transverse shaft 142 mounted in the brackets 144 secured to the hubs 24 of the cross head 22, the shaft 142 having an elongated rectangular plate 145 secured thereto which is provided with a latch or projecting member 146 adapted to contact with an adjustable set screw 148, mounted on the main frame of the conveyor section 2, upon movement of the cross head 22 into its lowermost position, whereby the plate 145 is moved into contacting engagement with the slices upon the conveyor element 42 and for compressing and compacting the same thereon to prevent their disengagement one from the other and the disturbing of their uniform arrangement. The arms 94 are provided with an upstanding projection 147 adapted also to prevent disengagement of the slices during their movement from conveyor elements 42 to the conveyor elements 66.

The subject matter of the foregoing specification relating to the spacing conveyor is described and claimed in our Patent No. 1,976,855 which issued October 16, 1934 in response to our application, Serial No. 642,580, filed November 14, 1932, as a division of our application Serial No. 554,628, filed August 3, 1931, of which this application is a continuation in part.

While we have herein described and upon the drawings shown an illustrated embodiment of the invention, it is to be understood that the invention is not limited thereto but may comprehend other constructions, arrangements of parts, details and features without departing from the spirit thereof.

Having thus disclosed the invention, we claim:

1. In a slicing machine, the combination of a reciprocating knife element operable to sever slices from a body of meat fed thereto, a conveyor for receiving said slices in uniform overlapped relation, and means associated with said element for compressing and compacting said slices in groups on said conveyor, said last mentioned means comprising a member carried by the machine frame and engaged by a movable member of said means whereby upon the relatively positioning of said last mentioned members the compressing and compacting effect upon the slices can be regulated.

2. In a slicing machine, the combination of a knife element for severing slices from a body of meat fed thereto, slow moving conveyor elements for receiving said slices, fast moving conveyor elements, means for compressing and compacting said slices on said slow moving conveyor elements, and means for transferring groups of said slices at intervals from said slow moving to said fast moving conveyor elements.

3. In a slicing machine, the combination of a knife element for severing slices from a body of meat fed thereto, slow moving conveyor elements for receiving said slices, fast moving conveyor elements, means for compressing and compacting said slices on said slow moving conveyor elements, and means for transferring groups of said slices at intervals from said slow moving to said fast moving conveyor elements, said means including means for preventing disengagement of said slices during transfer.

4. In a slicing machine, the combination of a knife element for severing slices from a body of meat fed thereto, slow moving conveyor elements for receiving said slices in uniformly spaced and overlapped relation, fast moving conveyor elements, means for compressing and compacting said slices on said slow moving conveyor elements, and means for transferring groups of said slices at intervals from said slow moving to said fast moving conveyor elements.

5. In a slicing machine, the combination of a knife element for severing slices from a body of meat fed thereto, slow moving conveyor elements for receiving said slices in uniformly spaced and overlapped relation, fast moving conveyor elements, means for compressing and compacting said slices on said slow moving conveyor elements, and means for transferring groups of said slices at intervals from said slow moving to said fast moving conveyor elements, said means including means for preventing disengagement of said slices during transfer.

6. In a slicing machine, the combination of a reciprocating knife element adapted to sever slices from a body of meat fed thereto, a conveyor for receiving said slices, a movable compressing plate movable with said element, and means for moving said plate into contact with said slices for compressing the same on said conveyor.

7. In a slicing machine, the combination of a reciprocating knife element adapted to sever slices from a body of meat fed thereto, a conveyor for receiving said slices, means for uniformly positioning said slices in spaced and overlapping relation on said conveyor, a movable compressing plate movable with said element, and means for moving said plate into contact with said slices for compressing the same on said conveyor.

8. In a slicing machine, the combination of a knife element operable to sever slices from a body of meat fed thereto, a conveyor means associated with said element and adapted to receive said slices, means for uniformly spacing said slices in overlapping relation one to the other on the said conveyor, a presser plate in operable relationship with said knife element adapted to compress and compact each slice against the others as it falls upon the conveyor.

9. In a slicing machine, the combination of a reciprocating knife element operable to sever slices from a body of meat fed thereto, a conveyor for receiving said slices in uniform overlapped relation, and means operatively connected with the reciprocating knife element and operable with each cutting stroke of the reciprocating knife element for compressing and compacting the overlapped slices on the said conveyor to prevent their disengagement one from the other and the disturbing of their uniform arrangement during operation of the conveyor.

10. In a slicing machine, the combination of a knife element operable intermittently to sever slices from a body of meat fed thereto, a continuously operating endless conveyor means mounted below the knife element to receive said slices in overlapped relation, means operating in synchronism with the knife element for successively compressing and compacting each slice against the others as it falls upon the conveyor to prevent relative lateral disarrangement of one slice with relation to another on said conveyor, and means associated with the conveyor and operable at intervals for moving sets of compressed and compacted slices away from beneath said knife and from said conveyor, whereby groups of slices are discharged in groups from said conveyor at intervals.

11. In a slicing machine, the combination of a reciprocating knife operable to sever slices from a body of meat fed thereto, means to receive and support said slices in overlapping relation, and means operatively associated with the reciprocating knife for movement therewith to compress and compact the overlapped slices on said receiving and supporting means as the knife reaches the end of its downward cutting stroke to compress the overlapped slices against relative sliding movement with relation to each other.

12. In a slicing machine, the combination of a frame, a knife operable to sever slices from a body of meat fed thereto, means to receive said slices from the knife, means for delivering the slices from the knife to said means in overlapped relation, and means including a pivoted member associated with said knife and operable therewith for compressing and compacting said overlapped slices on said receiving means, including a member carried by the machine frame engageable by said pivotal member on said second mentioned means.

13. In a meat slicing machine, a frame, a knife operable to sever slices from the meat fed thereto, a conveyor operating under the knife to receive the cut slices, means to deliver the cut slices to said conveyor in overlapped relation, means for compressing and compacting the slices on the conveyor including a pivoted member operatively connected with the knife and movable with the latter, and a member on the frame engageable by said pivotal member to effect the compressing and compacting action.

14. In a meat slicing machine, a frame, a cutting element operable to sever slices from the meat fed thereto, a conveyor to receive the cut slices, means for compressing and compacting the cut slices on the conveyor including a movable member associated with the knife and movable therewith, and a member on the frame engageable by said movable member whereby to actuate the latter for said compressing and compacting action.

15. In a meat slicing machine, a frame, a vertically operated cutting element to sever slices from the meat as the meat is fed thereto, a conveyor to receive the cut slices in overlapped relation, and means for compressing and compacting the cut slices on the conveyor including a spring controlled pivoted member associated with the knife and movable vertically with the latter, and a member on the frame engageable by said movable member whereby to shift said spring actuated member on its pivot against the spring action thereof into compressing and compacting relation with a plurality of overlapped slices on the conveyor on each downward stroke of the cutting element.

16. In a meat slicing machine, a frame, a cutting element mounted on the frame and operable to sever slices from a body of meat fed thereto, a conveyor to receive the severed slices as they are cut, means to direct the severed slices onto the conveyor in overlapping relation with one another, means operable to act upon each slice on the conveyor to compress and compact each slice upon a slice previously delivered to the conveyor, whereby to compress and compact successive groups of slices together, a second conveyor cooperating with the first conveyor and moving at a faster speed than the first conveyor, and means to transfer each compressed and compacted group of slices as a group from the first conveyor to the second conveyor.

17. In a meat slicing machine, a frame, a cutting element mounted on the frame and operable to sever slices from a body of meat fed thereto, a conveyor to receive the severed slices as they are cut, means to direct the severed slices onto the conveyor in overlapping relation with one another, means operable to act upon each slice on the conveyor to compress and compact each slice upon a slice previously delivered to the conveyor, whereby to compress and compact successive groups of slices together, a second conveyor cooperating with the first conveyor and moving at a faster speed than the first conveyor, means to transfer each compressed and compacted group of slices as a group from the first conveyor to the second conveyor, means for rapidly transferring each compressed and compacted group of slices as a group from the first conveyor to the second conveyor, means for cushioning the forward movement of said transfer means at the forward end of movement of the transfer means, and means for slowly returning said transfer means after deposit of a group of slices on the second conveyor back to the first conveyor.

18. In a slicing machine, the combination with a knife element operable intermittently to sever slices from a body of meat fed thereto, a continuously operating endless conveyor mounted below said knife element to receive said slices in overlapping relation, means in operable relation with said cutting element for successively compressing and compacting each slice against the others as it falls upon said receiving means, and means fixedly mounted on the frame of the machine for actuating said compressing and compacting means, said last-mentioned means being adjustable for regulating the degree of compressing and compacting action.

19. In a slicing machine, the combination with a vertically reciprocating crosshead, a knife element mounted upon said crosshead and operable to intermittently sever slices from a body of meat fed thereto, a continuously operating endless conveyor means associated with said knife element to receive said slices in overlapped relation, a normally retracted means pivotally mounted on said crosshead relative to said knife element for successively compressing and compacting each slice on said conveyor after the slicing operation, and means on the machine engageable by the normally retracted means to actuate the latter to effect said compressing and compacting action on the meat slices.

20. In a slicing machine, the combination of a reciprocating knife element operable to sever slices from a body of meat fed thereto, a continuously operating endless conveyor to receive said slices in substantially horizontal overlapped inclined relation, means pivotally mounted relative to the cutting edge of the knife element and operating in synchronism with the reciprocating knife element for successively compressing and compacting the inclined overlapped slices upon delivery to the conveyor against relative lateral disarrangement while on the conveyor, and means operatively connected with said conveyor for removing the compressed and compacted overlapped inclined slices from the conveyor as a group.

HARRY H. McKEE.
NICHOLAS J. DZIEDZIC.